(12) United States Patent
Hertrich

(10) Patent No.: US 7,020,885 B2
(45) Date of Patent: Mar. 28, 2006

(54) DATA STORAGE CARTRIDGE LOADING SYSTEM

(75) Inventor: Gregory P. Hertrich, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 160 days.

(21) Appl. No.: 10/632,659

(22) Filed: Jul. 31, 2003

(65) Prior Publication Data
US 2005/0028180 A1 Feb. 3, 2005

(51) Int. Cl.
G11B 17/03 (2006.01)
G11B 17/04 (2006.01)
G11B 23/03 (2006.01)

(52) U.S. Cl. ............ 720/632; 720/643; 720/740
(58) Field of Classification Search .......... 720/632, 720/643, 740, 600, 630, 639, 641, 644, 689, 720/738; 360/99.06, 99.07; 369/275.5, 369/720.1, 258.1, 77.21, 78, 103, 112.01, 369/112.1, 112.15, 224, 224.1
See application file for complete search history.

(56) References Cited

U.S. PATENT DOCUMENTS

| | | | | |
|---|---|---|---|---|
| 4,340,955 A | * | 7/1982 | Elliott | 369/213 |
| 4,541,086 A | * | 9/1985 | Tanaka | 720/711 |
| 5,530,691 A | | 6/1996 | Fujisawa | 720/731 |
| 5,719,691 A | | 2/1998 | Curtis et al. | |
| 5,822,296 A | * | 10/1998 | Nakamichi | 720/615 |
| 5,894,464 A | * | 4/1999 | Kim et al. | 369/112.12 |
| 6,034,840 A | | 3/2000 | Yamamoto et al. | 360/97.01 |
| 6,118,619 A | | 9/2000 | Kabasawa | 360/99.06 |
| 6,154,431 A | | 11/2000 | Arai et al. | 720/632 |
| 6,175,471 B1 | | 1/2001 | Meguro | 360/133 |
| 6,191,875 B1 | | 2/2001 | Curtis et al. | 359/11 |
| 6,205,105 B1 | * | 3/2001 | Okamoto et al. | 720/644 |
| 6,307,711 B1 | | 10/2001 | Higuchi et al. | 360/133 |
| 6,512,728 B1 | | 1/2003 | Nasu et al. | 720/639 |
| 2003/0025955 A1 | | 2/2003 | Curtis | 359/35 |
| 2004/0194151 A1 | * | 9/2004 | Earhart | 725/135 |
| 2005/0028185 A1 | | 2/2005 | Hertrich | 720/725 |
| 2005/0028186 A1 | | 2/2005 | Hertrich | 720/738 |

FOREIGN PATENT DOCUMENTS

JP 2001-155461 A * 6/2001

OTHER PUBLICATIONS

ECMA Brochure (Jun. 2001). "Data Interchange on 130 mm Magneto-Optical Disk Cartridges—Capacity: 9,1 Gbytes per Cartridge," *Standard ECMA*-322, pp i-vii, 1-151.

* cited by examiner

*Primary Examiner*—Julie Anne Watko
(74) *Attorney, Agent, or Firm*—Morrison & Foerster LLP

(57) ABSTRACT

A data drive and a method of operating a data drive are provided. The data drive includes a drive base; a data transfer mechanism coupled to the drive base; a carriage assembly for receiving a cartridge containing a data storage medium; and a carriage assembly actuator coupled to the drive base for translating the carriage assembly to expose a plurality of radial positions of the data storage medium to the data transfer mechanism. The method includes receiving a data storage cartridge containing a rotatable data storage medium into a carriage assembly; translating the carriage assembly across a data transfer mechanism; and reading data from the data storage medium using the data transfer mechanism as the carriage assembly is being translated across the data transfer mechanism.

45 Claims, 12 Drawing Sheets

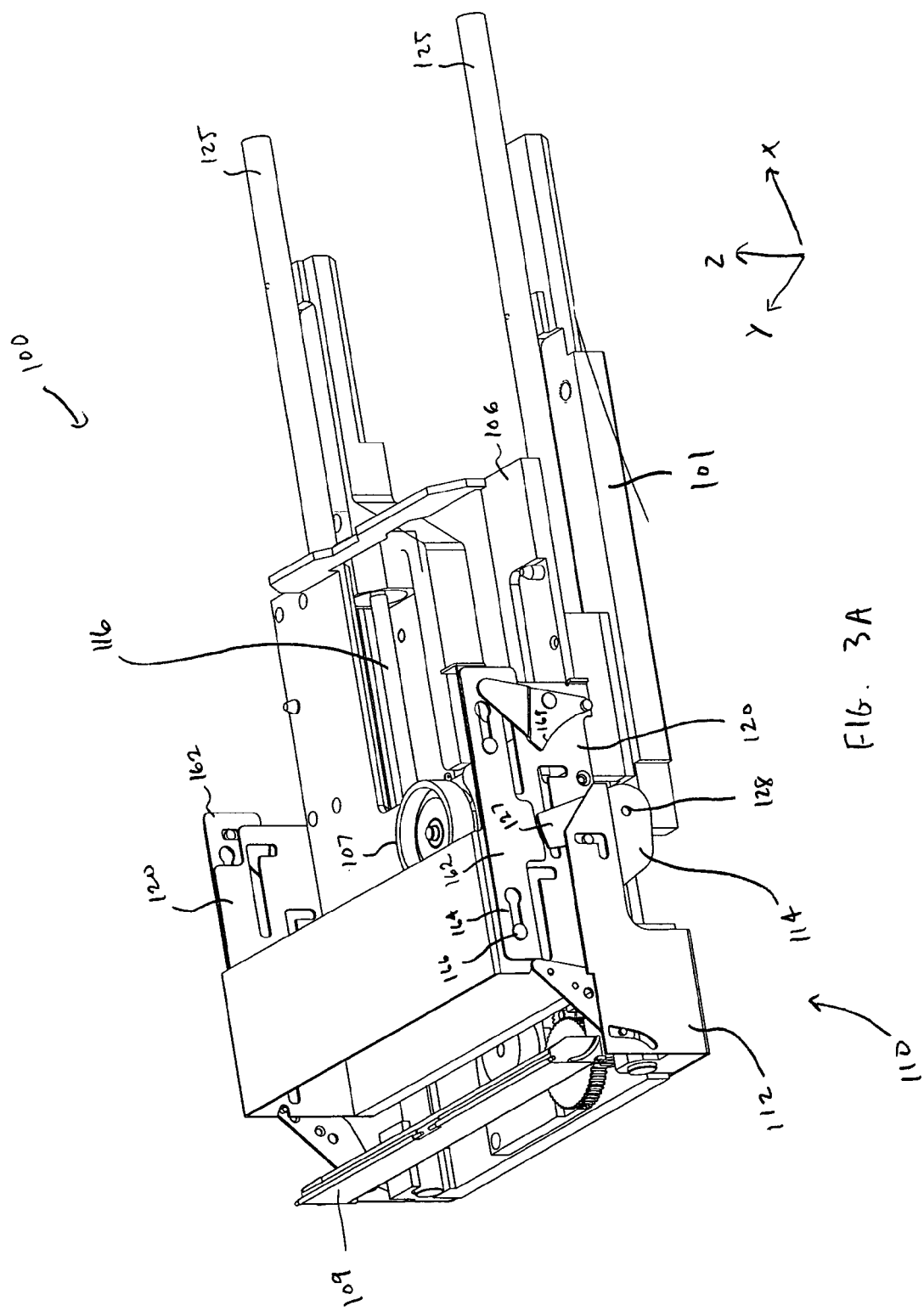

DATA STORAGE CARTRIDGE LOADING SYSTEM

BACKGROUND OF THE INVENTION

Data storage drives have been used to read data from and write data to removable data cartridges. These removable data storage cartridges may include a disk-shaped data storage medium having a rotatable hub provided at the center of the disk. Some data storage drives include a "soft load" mechanism, which receives a data cartridge inserted into a load port of the drive, and translates the cartridge to couple the hub in the data cartridge with a spindle mechanism in the drive. The loading mechanism typically translates the cartridge first in a lateral direction to draw the cartridge fully into the drive, and second in a downward direction to lower the cartridge onto the stationary spindle. After coupling, the spindle rotates the data storage medium past a radially positionable read/write head, which can read data from and/or write data to various locations on the data storage medium.

This drive design may be sufficient when used with a read/write head having a mass and size such that it can easily be translated within the drive in order to read data from the annular tracks on the disk media. This is particularly true with magnetic disk drives, which utilize a tiny read/write head mounted on a thin slider that can be easily positionable using a voice coil mechanism. However, some data storage technologies utilize read/write heads that are larger, more massive, or more complex, making it difficult to utilize conventional drive designs and loading mechanisms. Accordingly, there is a need for an improved design for a data storage drive loading mechanism.

BRIEF SUMMARY OF THE INVENTION

In accordance with embodiments of the present invention, a data drive is provided. The data drive comprises a drive base; a data transfer mechanism coupled to the drive base; a carriage assembly for receiving a cartridge containing a data storage medium; and a carriage assembly actuator coupled to the drive base for translating the carriage assembly to expose a plurality of radial positions of the data storage medium to the data transfer mechanism.

In accordance with other embodiments of the present invention, a method of operating a data drive is provided. The method comprises receiving a data storage cartridge containing a rotatable data storage medium into a carriage assembly; translating the carriage assembly across a data transfer mechanism; and reading data from the data storage medium using the data transfer mechanism as the carriage assembly is being translated across the data transfer mechanism.

In accordance with other embodiments of the present invention, a data drive is provided. The data drive comprises: a data transfer mechanism; a carriage assembly for receiving a cartridge containing a data storage medium and having a movable shutter having a shutter lock; and a shutter opener comprising a lock release for releasing a lock on the cartridge.

In accordance with other embodiments of the present invention, a method of operating a data drive is provided. The method comprises: receiving into a data drive a data storage cartridge having a movable shutter configured to expose a data storage medium in the data storage cartridge when the shutter is in an open position; and after the shutter of the data storage cartridge has been completely received into the data drive, moving the shutter into the open position.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

FIGS. 3A–3B are additional views of a data drive assembly having various components removed for clarity, in accordance with embodiments of the present invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

Figure 1:
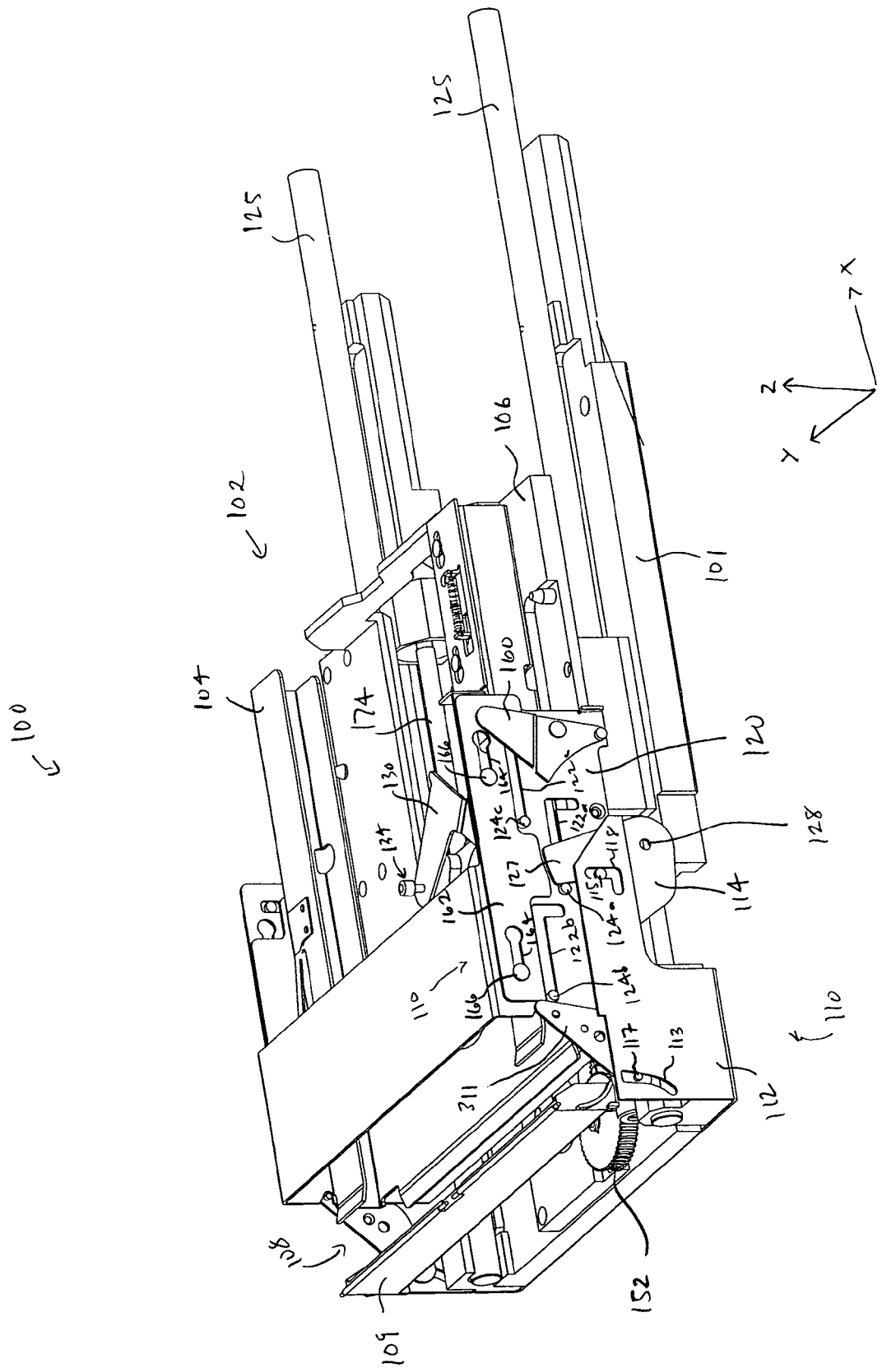
FIG. 1 is a perspective view of a data drive assembly, in accordance with embodiments of the present invention.

FIG. 1 shows a perspective view of a data drive assembly 100, in accordance with embodiments of the present invention. A data storage drive may include the data drive assembly 100 enclosed within a drive housing having a drive bezel (not shown). The data storage drive may, in turn, be provided as part of a cartridge library or other computer system. The data drive assembly 100 comprises a drive base 101 and a carriage assembly 102. The carriage assembly comprises a movable cartridge carrier 104 and a movable sled 106. The carrier 104 includes a load port 108 through which a data storage cartridge passes when the cartridge is being loaded into the data drive assembly 100. A drive door 109 may be provided for covering the load port 108 when the data storage device is in use.

The data drive assembly 100 further comprises a carrier loading assembly 110 which is configured to translate the carrier 104 either from a load position to an unload position or from an unload position to a load position. The carrier loading assembly 110 comprises a load plate 112 and a carrier cam 114. The data drive assembly 100 also comprises a pair of carrier guides 120, one positioned on either side of the carrier 104. Each carrier guide 120 may include one or more guide slots 122 which receive guide pins 124 protruding from the sides of the carrier 104. These guide slots 122 may be L-shaped in order to guide the carrier 104 from the unload position to the load position, as will be described in greater detail below. In the illustrated embodiment, the carrier guides 120 are formed from a single sheet of metal formed in a U-shape.

In accordance with aspects of the present invention, the carrier 104 is configured to receive a data storage cartridge when in the unload position, as shown in FIG. 1. After a cartridge is inserted, the carrier loading assembly 110 drives the carrier 104 to move from the unload position to a load position such that a hub provided on the data storage cartridge is mated with a spindle 107 (shown in FIG. 3A) provided on the sled 106. A data transfer mechanism 300 (shown in FIGS. 10A–10B) may be fixedly mounted onto the drive base for reading data from and/or writing data to the storage medium contained within the data storage cartridge. Because the data transfer mechanism 300 has a fixed position, the sled 106 is configured to move back and forth in a horizontal x-direction along rails 125 to enable the data transfer mechanism 300 to read data from the entire surface of the storage medium. A carriage motor 172 (shown in FIG. 10B) may be used to rotate a leadscrew 174, which, in turn, may be coupled to the sled 106, thereby actuating horizontal movement of the sled 106.

As used herein, the term "data transfer mechanism" is defined as a mechanism which can either: (1) read data from a data storage medium; (2) write data to a data storage medium; or (3) read data from and write data to a data storage medium. Various methods can be used for storing and reading the data, including, e.g., optical, magneto-optical, magnetic, and electrical. In some embodiments, a holographic read/write assembly may be used as the data transfer mechanism.

Figure 2:
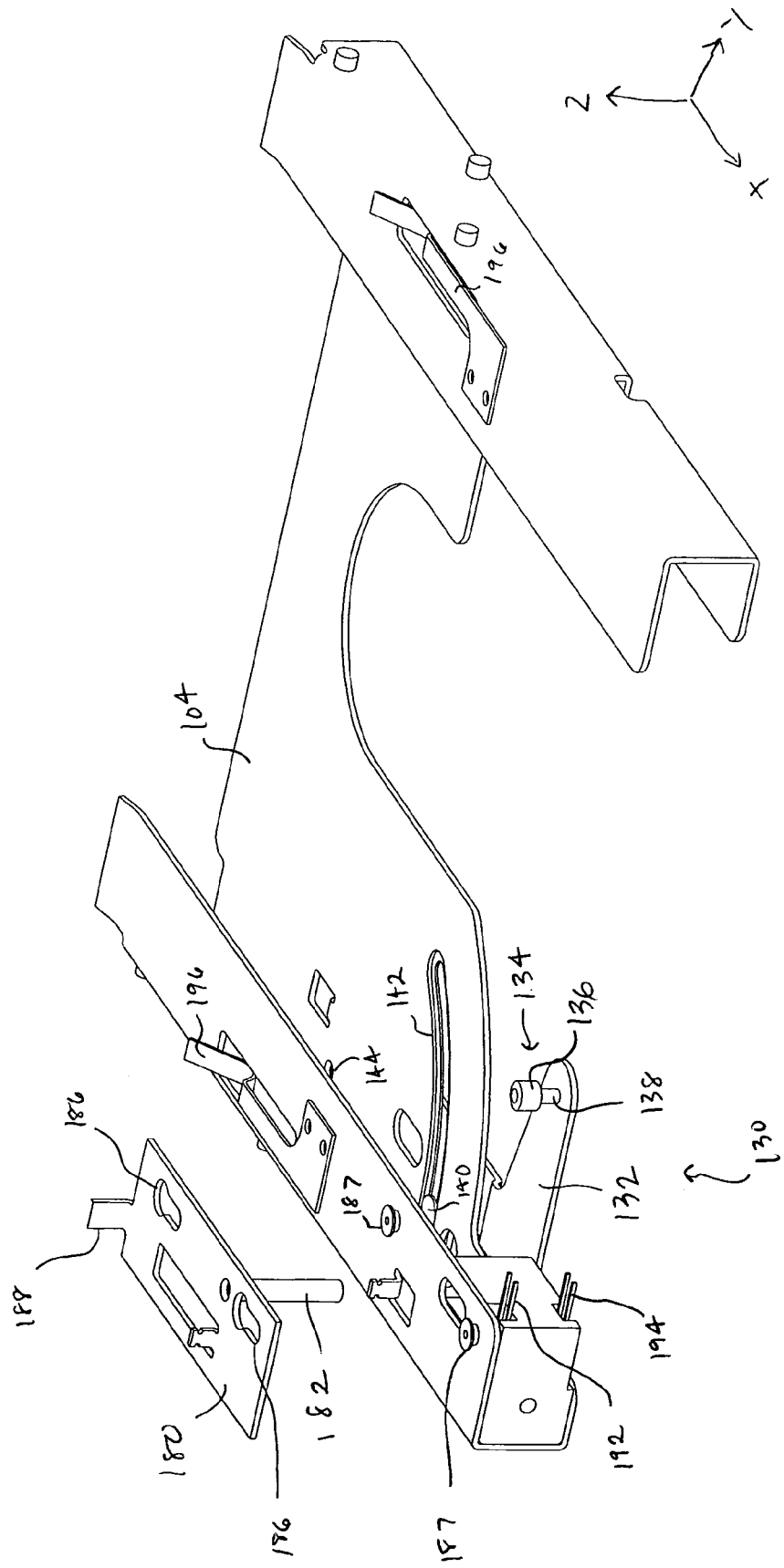
FIG. 2 is an exploded view of a cartridge carrier, in accordance with embodiments of the present invention.

FIG. 2 is an exploded view of the cartridge carrier 104. The illustrated embodiment includes a shutter opener 130 having a shutter opener body 132 and a lock release. The lock release comprises a boss 134 having a lock release portion 136 and a shutter opening portion 138. The shutter opener 130 is configured to rotate about a rotation pin 144 and is guided in its rotation by guide pin 140, received in guide slot 142. A shutter opener lock 180 having a lock pin 182 is provided for releasably locking the shutter opener 130 in the open position (as shown in FIG. 2) when the drive is in operation with a cartridge loaded therein, as will be described in greater detail below. A lock release tab 188 is provided for releasing the shutter opener lock 180 during the unload process.

Figure 3B:
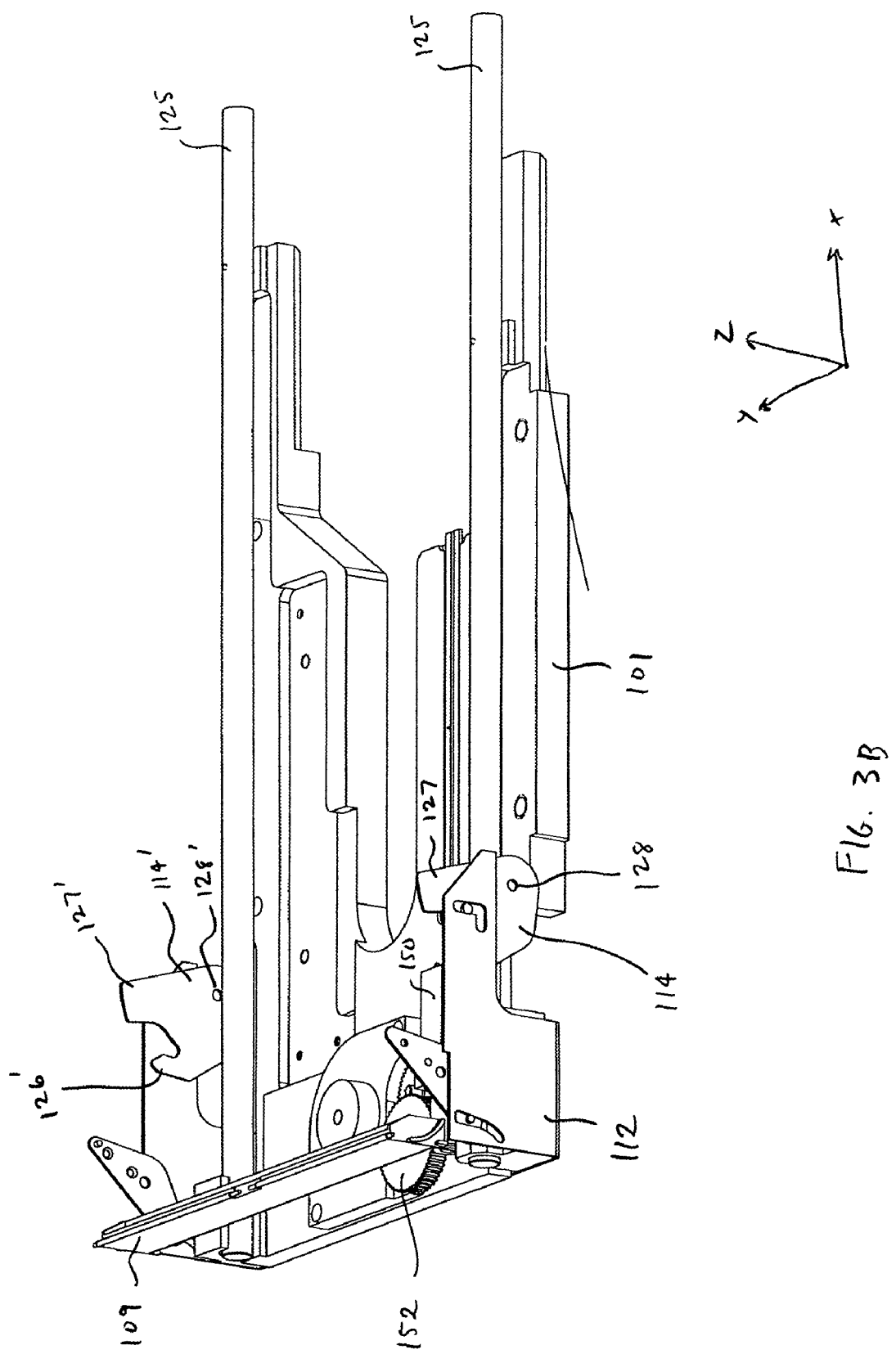

FIGS. 3A–3B are additional views of the data drive assembly 100, having certain components removed for clarity. In FIG. 3A, the carrier 104 is removed, exposing the sled 106 and the spindle 107. FIG. 3B shows the drive base 101, having the carriage assembly 102 (comprising the carrier 104 and the sled 106) and the carrier guide 120 removed. A load plate motor 150 can be seen in this figure. The motor 150 is coupled to the load plate 112 through a gear assembly 152 to actuate linear movement of the load plate 112 during the loading process.

Figure 4:
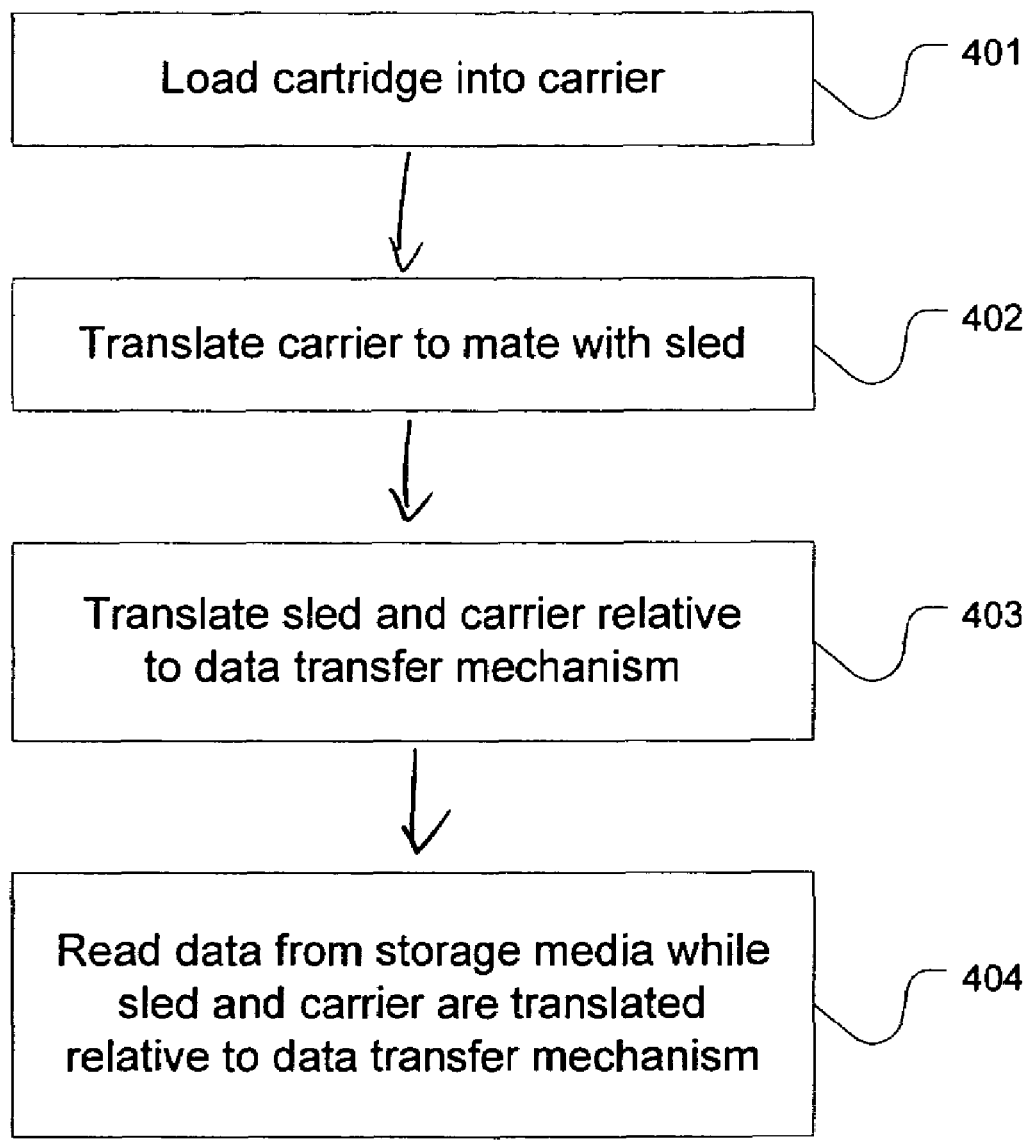
FIG. 4 is a flowchart showing a process of operating a data drive in accordance with embodiments of the present invention.

FIG. 4 is a flowchart showing a process of operating a data drive in accordance with embodiments of the present invention. In step 401, a data storage cartridge 200 is inserted into the cartridge carrier 104. In step 402, the carrier 104 is translated to be mated with the sled 106. After the carrier 104 and the sled 106 are mated, they are translated together in step 403 relative to a data transfer mechanism 300 (shown in FIGS. 10A–10B). In step 404, as the carrier 104 and the sled 106 are translating past the data transfer mechanism 300, the data transfer mechanism 300 is used to read data from and/or write data to the data storage medium 210 contained within the data storage cartridge 200.

Figure 5A:
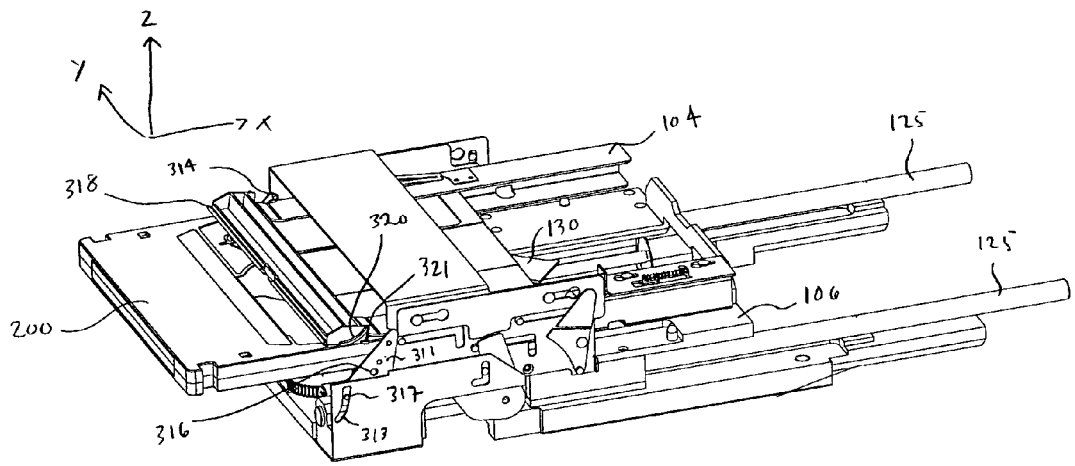
FIGS. 5A–5D are various views of a data drive assembly with a cartridge partially inserted therein, in accordance with embodiments of the present invention.
Figure 5B:
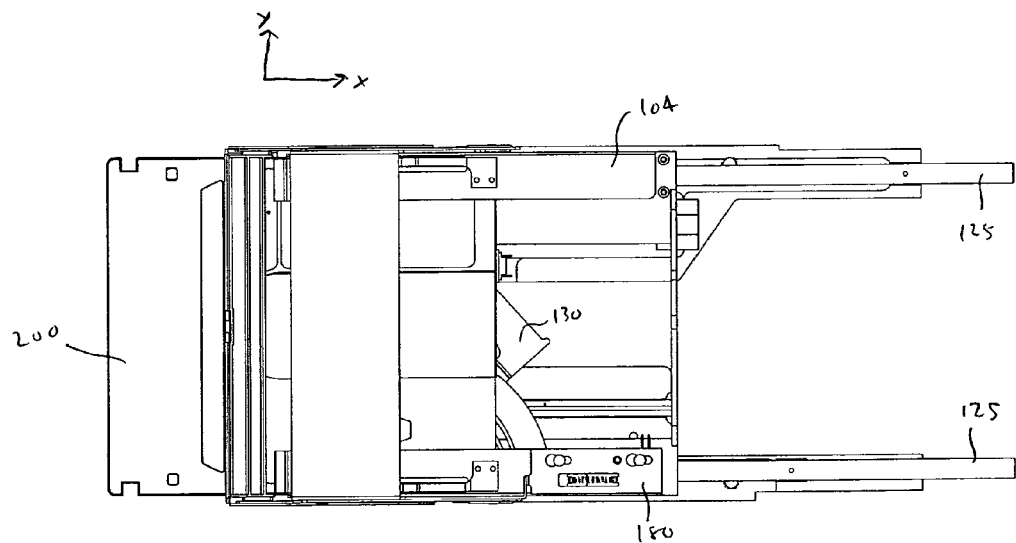
Figure 5C:
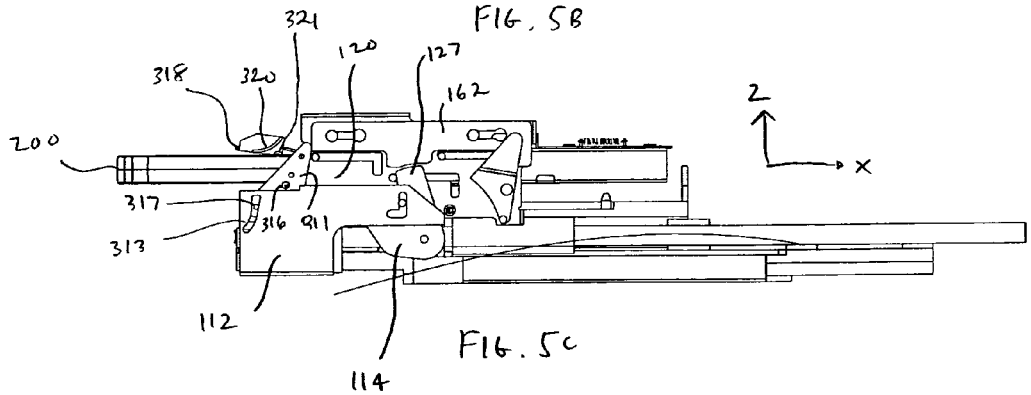
Figure 5D:
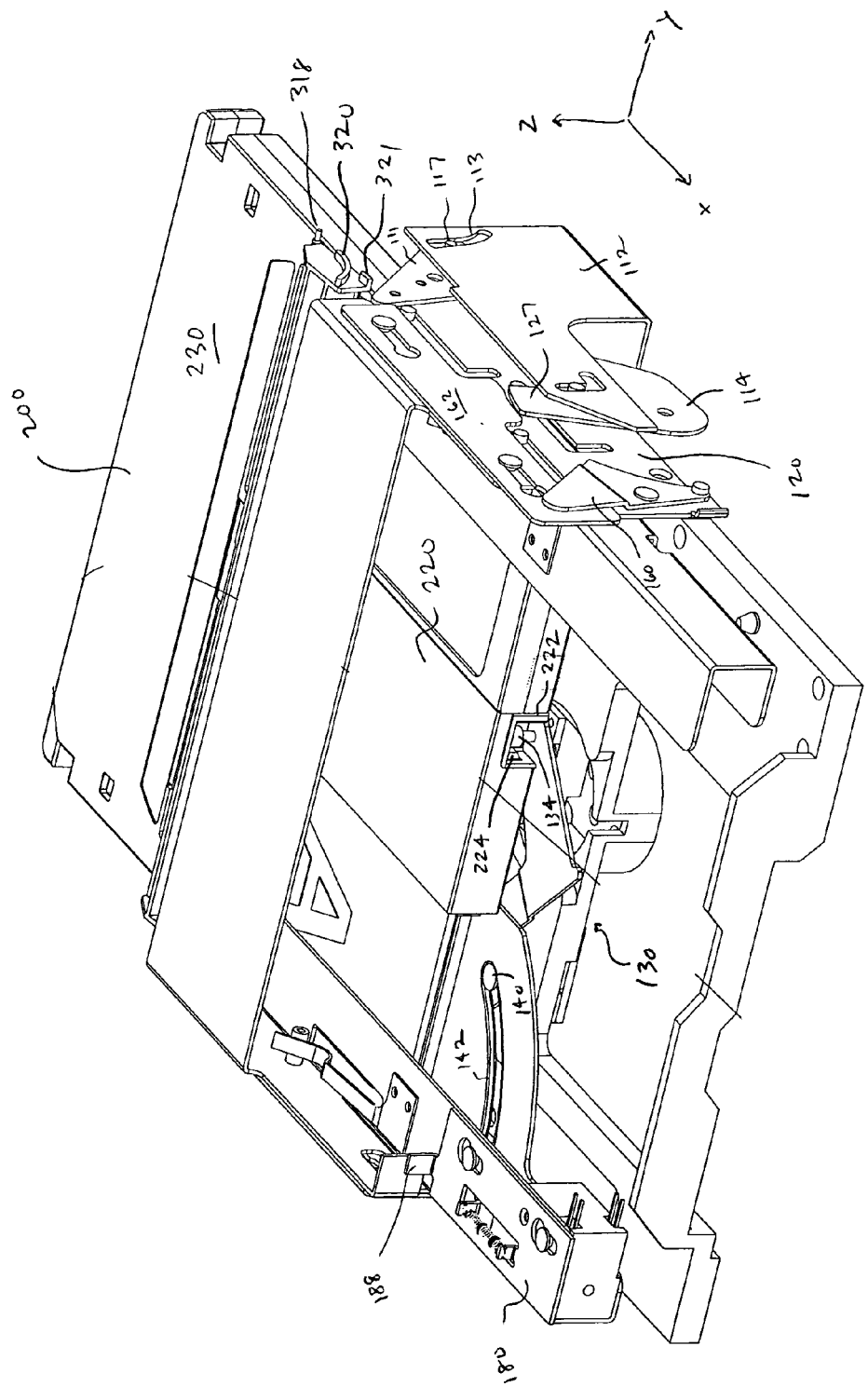

FIGS. 5A–5D illustrate the state of the data drive assembly 100 during step 401. FIG. 5A shows a perspective front view of the data drive assembly 100 in which the cartridge carrier 104 is in the unload position with the cartridge 200 partially inserted therein. FIG. 5B is a top view, FIG. 5C is a side view, and FIG. 5D is a perspective rear view of the same state illustrated in FIG. 5A.

Figures 6A, 6B:
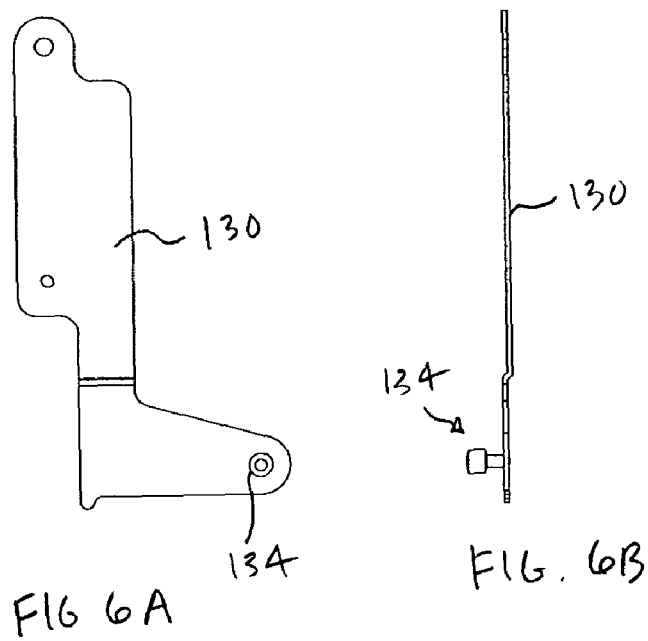
FIGS. 6A–6B are top and side views of a shutter opener, in accordance with embodiments of the present invention.

In some embodiments of the present invention, the loading of the cartridge 200 into the carrier 104 is performed manually by the user or by a mechanical robotic insertion device, without assistance from the data drive assembly 100. In addition, the carrier 104 may be provided with a shutter opener 130 for opening a shutter 220 on the cartridge 200. The shutter opener 130 may be provided with a boss 134 that can be used to both unlock the shutter 220 and to slide the shutter 220 to the side, thereby exposing the storage medium 210. As shown in FIG. 5D, when the cartridge 200 is inserted into the carrier 104 a first distance in the x-direction, the boss 134 enters a shutter slot 222 in the shutter 220. Inside the shutter slot 222 is a lock actuator 224, which is coupled to a shutter lock within the cartridge 200. The shutter lock prevents the shutter 220 from opening unless the lock actuator 224 is depressed. FIGS. 6A–6B show top and side views of an exemplary shutter opener 130.

As the cartridge 200 is inserted deeper into the carrier 104 in the positive x-direction, the top portion (i.e., the lock release portion 136) of the boss 134, which has a larger diameter than the bottom portion (i.e., the shutter opening portion 138), applies a pressure in the negative y-direction onto the lock actuator 224. As the cartridge 200 continues moving rearward in the positive x-direction, the shutter slot 222 applies a force in the positive x-direction onto the boss 134, causing the boss 134 to travel with the cartridge 200 in the x-direction. Because the shutter opener 130 is rotatably mounted to rotation pin 144, as the boss 134 is pushed in the x-direction, the rotational path of travel of the boss 134 causes the boss 134 to simultaneously travel in the negative y-direction (as indicated by the axes illustrated in FIG. 5D). This movement enables the boss 134 to travel together with the cartridge 200 in the x-direction, while applying a force against the shutter slot 222 in the negative y-direction.

Because the lock release portion 136 and the shutter opening portion 138 are differently sized, they contact the shutter slot 222 at different points. In the illustrated embodiment, the lock release portion 136 has a radius that is 1.0 mm larger than the radius of the shutter opening portion 138. Thus, the upper portion of the boss 134 (i.e., the lock release portion 136) causes the lock actuator 224 to be depressed into the cartridge 200, thereby unlocking the shutter lock. After the shutter lock is released, the smaller diameter lower portion of the boss 134 (i.e., the shutter opening portion 138)

contacts the edge of the shutter slot 222 and pushes the shutter 220 in the negative y-direction, thereby opening the shutter 220.

Figure 7A:
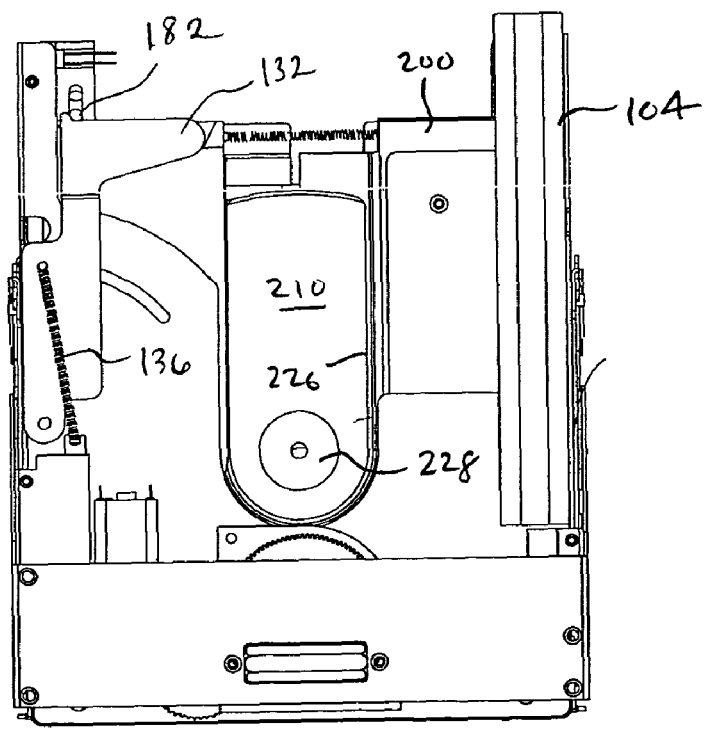
FIGS. 7A–7C are various views of a data drive assembly with a cartridge fully inserted therein, in accordance with embodiments of the present invention.
Figure 7B:
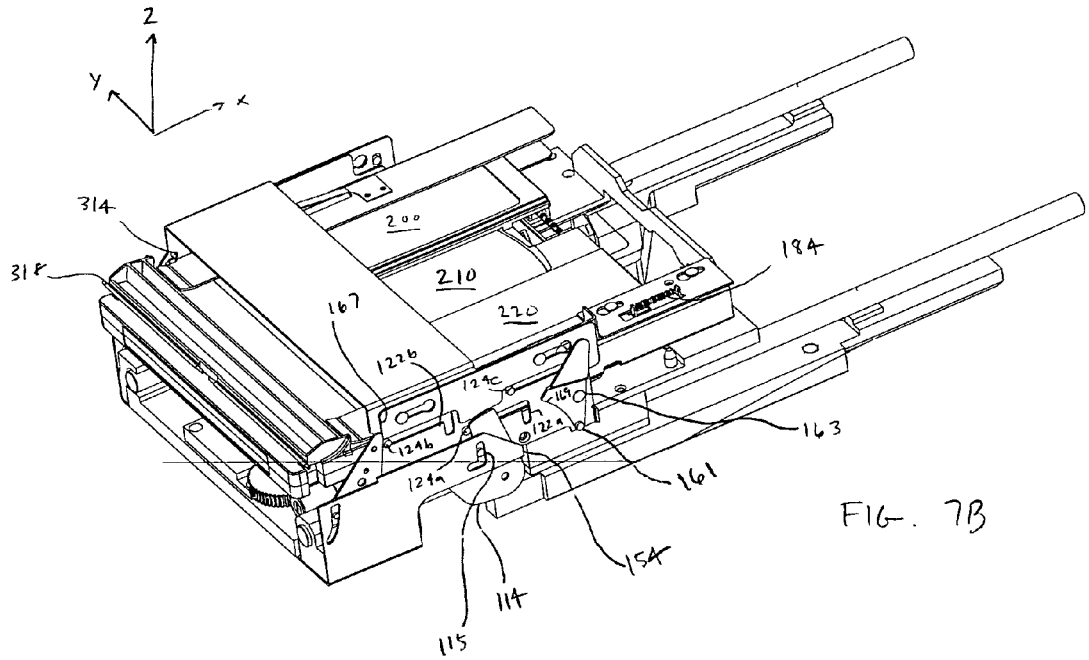
Figure 7C:
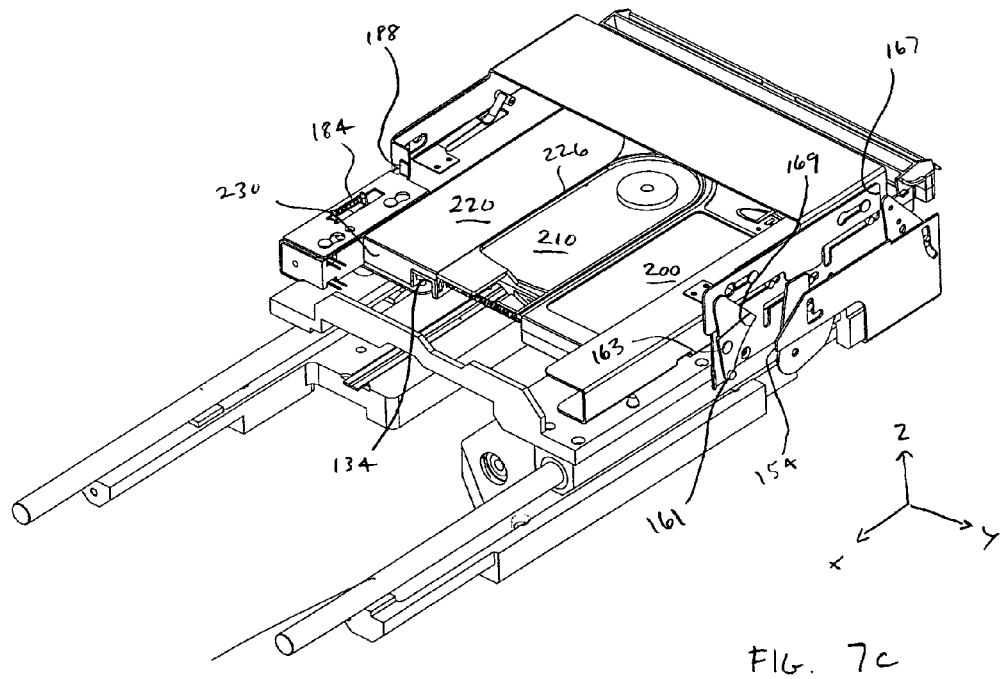

When the cartridge 200 has been fully inserted into the carrier 104, the boss 134 will have drawn the shutter 220 into the fully open position, as shown in FIGS. 7A–7C. FIG. 7A is a view of the bottom of the cartridge carrier 104 with the cartridge 200 fully inserted therein. FIG. 7B shows a front perspective view and FIG. 7C shows a rear perspective view of the same state. Here, it can be seen that when the shutter 220 is fully open, a media aperture 226 in the cartridge 200 is exposed. A portion of the top and bottom surfaces of the storage medium 210 are exposed by the media aperture 226. As the hub 228 at the center of the storage medium 210 is rotated by the spindle 107, successive portions of the storage medium 210 are exposed by the media aperture 226. This enables the data transfer mechanism 300 to access the complete surface of the storage medium 210, as will be described in further detail below.

A cartridge present sensor may be provided near the back end of the carrier 104 to detect when a cartridge 200 has been fully inserted into the carrier 104. The cartridge present sensor may comprise a spring-loaded plunger that contacts the cartridge 200 towards the end of the cartridge's insertion into the carrier 104. When the cartridge 200 is fully inserted, the plunger breaks an IR beam powered by leads 192. This break in the IR beam is detected by a phototransistor, which then transmits a signal along leads 194 to a controller for the data drive assembly 100, indicating that the cartridge 200 has been fully inserted. This may instruct the controller to initiate the next step in the loading process.

Figure 8:
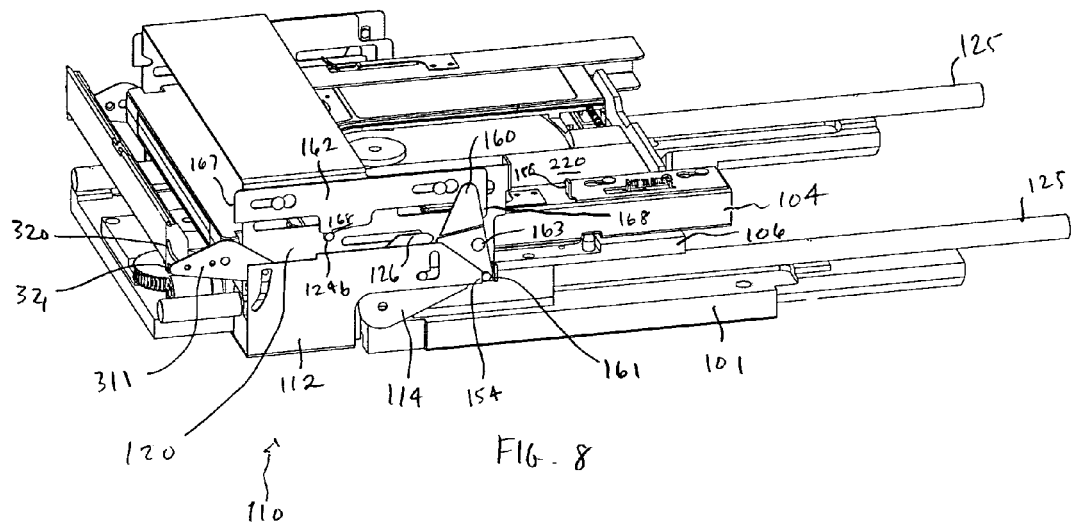
FIG. 8 is a perspective view of a data drive assembly with the carriage assembly in a first position, in accordance with embodiments of the present invention.
Figure 11A:
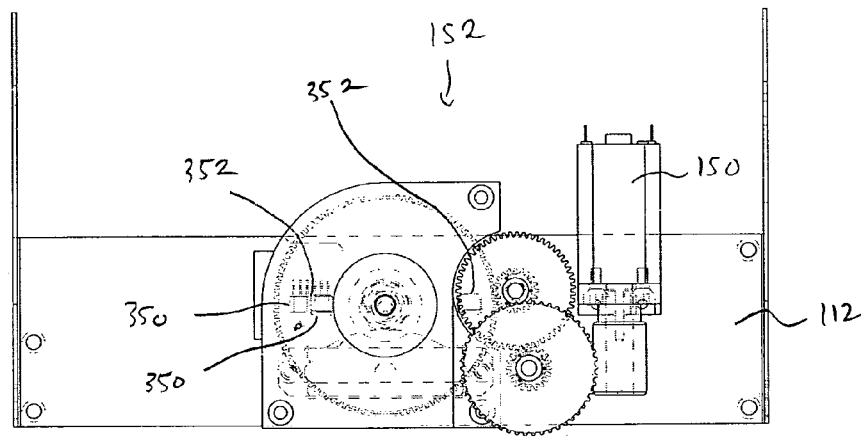
FIGS. 11A–11C are perspective views of a load plate motor assembly, in accordance with embodiments of the present invention.
Figure 11B:
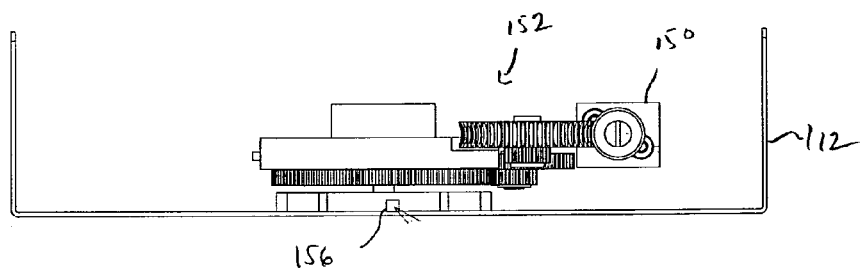
Figure 11C:
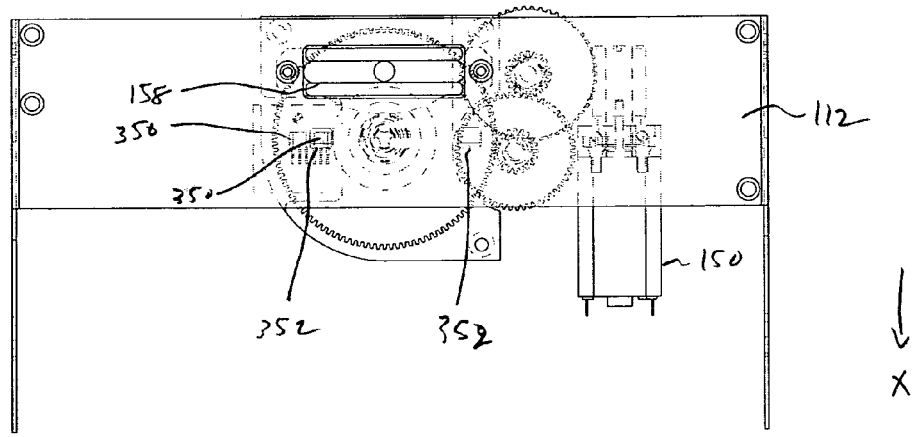

In step 402, the carrier 104 is translated to move from an unload position (as shown in FIGS. 7B–7C) into a load position (as shown in FIG. 8) to mate with the sled 106. A carrier loading assembly 110 may be provided to actuate the movement of the carrier 104, as shown in FIG. 8. As described above, the carrier loading assembly 110 may comprise a load plate 112. The load plate motor 150 drives the gear assembly 152, which, in turn, causes movement of the load plate 112 in the x-direction. This is shown in FIGS. 11A–11C, which show top, front, and bottom views of the load plate motor 150 and gear assembly 152. A pin 156 provided in the last gear of the gear assembly 152 mates with a slot 158 in the load plate 112. Rotation of the last gear through a 180° angle causes the pin 156 to rotate in a circular path. The slot 158 translates this circular movement into linear movement of the load plate in the x-direction.

The load plate 112 includes an L-shaped cam guide slot 118, which receives a guide pin 115 on the carrier cam 114. The carrier guide 120 includes three L-shaped guide slots 122, which receive the guide pins 124 on the carrier.

The carrier cam 114 is provided with a load arm 126 and an unload arm 127. When the load plate 112 is driven in the x-direction, the cam guide slot 118 applies a force against the carrier cam guide pin 115, causing the carrier cam 114 to rotate about its axis 128. As shown in FIG. 7B, this rotation is in the clockwise direction. This causes the load arm 126 of the carrier cam 114 to contact the driving guide pin 124a and push the driving guide pin 124a along the horizontal first segment of the guide slot 122. Guide pins 124b–124c also travel along the horizontal first segments of the guide slots 122b–122c to provide additional support for the carrier 104. The travel of the guide pins 124a–124c causes the carrier 104 to move in the rearward x-direction until the driving guide pin 124a reaches the end of the horizontal first segment of the guide slot 122a.

At this point, the hub 228 on the cartridge 200 is positioned directly above the spindle mechanism 107. Now, in order to mate the hub 228 with the spindle 107, the carrier 104 is lowered onto the sled 106. This can be accomplished by continuing to move the load plate 112 in the rearward direction, which causes the carrier cam 114 to continue to rotate. After the guide pins 124 have reached the end of the first segments of the guide slots 122, the carrier cam 114 will have rotated sufficiently far that the load arm 126 has begun to apply a downward force onto the guide pin 124a. This causes the guide pin 124a to travel along the vertical second segment of the guide slot 122a. Accordingly, the carrier 104 begins to travel in the downward negative z-direction. Once the guide pins 124 have reached the ends of the vertical second segments of the guide slots 122, the carrier 104 will have been fully lowered onto the sled 106, thereby mating the hub 228 with the spindle 107.

In accordance with some embodiments of the present invention, a carrier locking assembly may be provided. The carrier locking assembly may comprise a lock cam 160 and a lock plate 162. The lock plate 162 may include a pair of lock plate guides 164, which mate with lock plate pins 166 on the carrier guide 120. As the carrier cam 114 reaches the end of its rotational travel during the carrier loading process, a tip 154 of the load plate 112 contacts a pin 161 on the lock cam 160, causing the lock cam 160 to rotate about a lock cam pivot pin 163 on one end of the lock cam 160. The other end of the lock cam 160 is coupled to the lock plate 162 such that as the lock cam 160 rotates, the lock plate 162 is driven in the negative x-direction. The movement of the lock plate 162 positions a pair of locking portions 168 (one of which is partially hidden behind the lock cam 160) of the lock plate 162 snugly against the top of the guide pins 124b–124c, as shown in FIG. 8. With the locking portions 168 in this position, the guide pins 124b–124c are prevented from traveling back up the vertical second segments of the guide slots 122b–122c, thereby preventing the carrier 104 from uncoupling with the sled 106. This helps to retain the cartridge 200 in place during operation of the drive.

During the unloading process, when the carrier 104 is uncoupled from the sled 106, the load plate 112 moves in the negative x-direction, causing the carrier cam 114 to rotate in the opposite direction from the rotational direction during the coupling process. During this rotation, the unload arm 127 contacts a unload surface 169 of the lock cam 160, causing the lock cam 160 to rotate. The rotation of the lock cam 160 moves the lock plate 162 in the positive x-direction such that the pins 124b–124c are free to move vertically through the vertical segments of the slots 122b–122c before the unload arm 127 contacts the pin 124a on the carrier 104.

As the load plate 112 approaches the end of its travel in the negative x-direction during uncoupling, the door cam 311 contacts a surface 167 on the lock plate 162, moving the lock plate 162 further in the positive x-direction. This movement of the lock plate 162 causes the lock cam 160 to rotate further, creating additional clearance between the carrier cam 114 and the lock cam 160 for subsequent loads. In addition, the door cam 311 may further prevent the lock plate 162 from moving in the negative x-direction accidentally. This movement may cause the locking portions 168 to block the vertical portions of the guide slots 122b–122c.

The load and unload points for the load plate 112 can be sensed by, for example, implementation of a pair of magnets 352 on the last gear of the gear assembly 152 (as shown in FIGS. 11A–11C). These magnets 352 may be sensed by implementation of fixed Hall Effect sensors 350 on the gear housing, one for the load endpoint and one of the unload endpoint.

Figure 9:
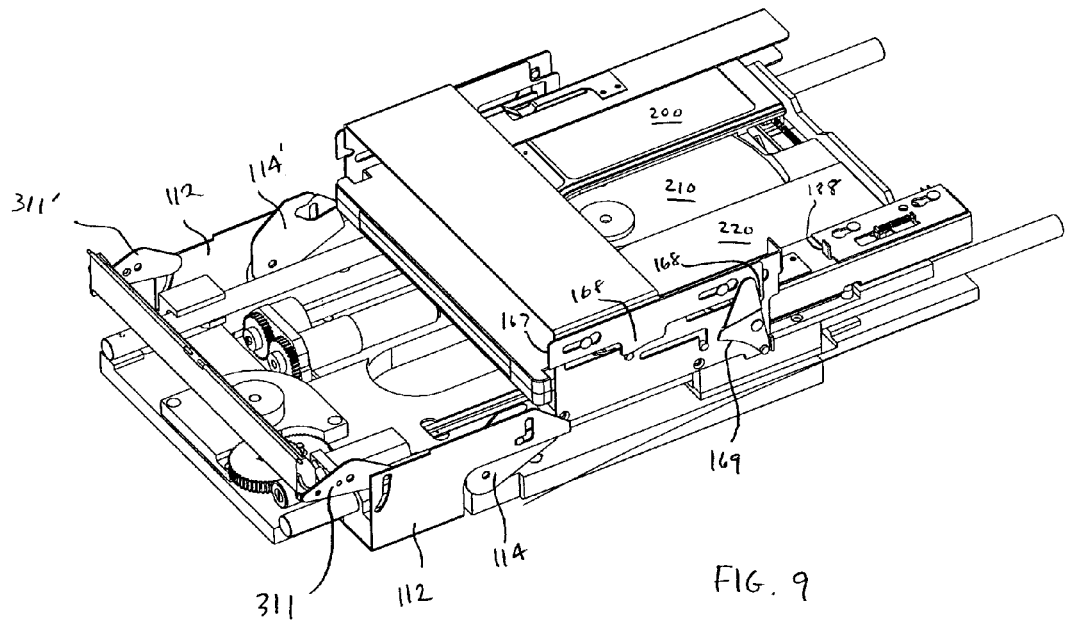
FIG. 9 is a perspective view of a data drive assembly with the carriage assembly in a second position, in accordance with embodiments of the present invention.

The carrier 104 mated with the sled 106 together with the carrier guide 120, the lock cam 160, and the lock plate 162 form a carriage assembly 102. This carriage assembly 102 can be translated as a unit back and forth in the positive and negative x-direction along the rails 125. FIG. 8 shows the carriage assembly at one end of its travel and FIG. 9 shows the carriage assembly at the other end of its travel. This movement of the carriage assembly 102 can be particularly advantageous when the data drive includes a stationary data transfer mechanism 300. As described above, many conventional data drive systems utilize a read/write head that travels back and forth across the rotating storage media in a stationary cartridge. In these systems, it is unnecessary to move the storage media in order for the read/write head to access the entire media surface. In contrast, in accordance with embodiments of the present invention, a stationary data transfer mechanism may be utilized.

Figure 10A:
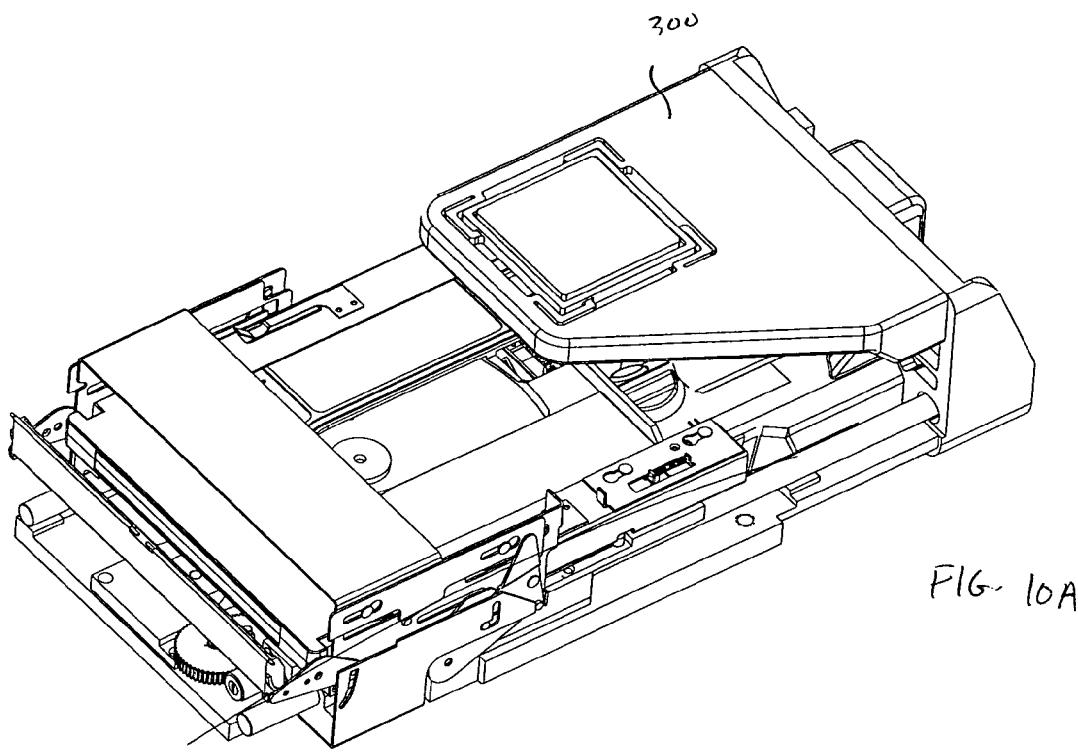
FIGS. 10A–10B are perspective views of a data drive assembly having a data transfer mechanism, in accordance with embodiments of the present invention.
Figure 10B:
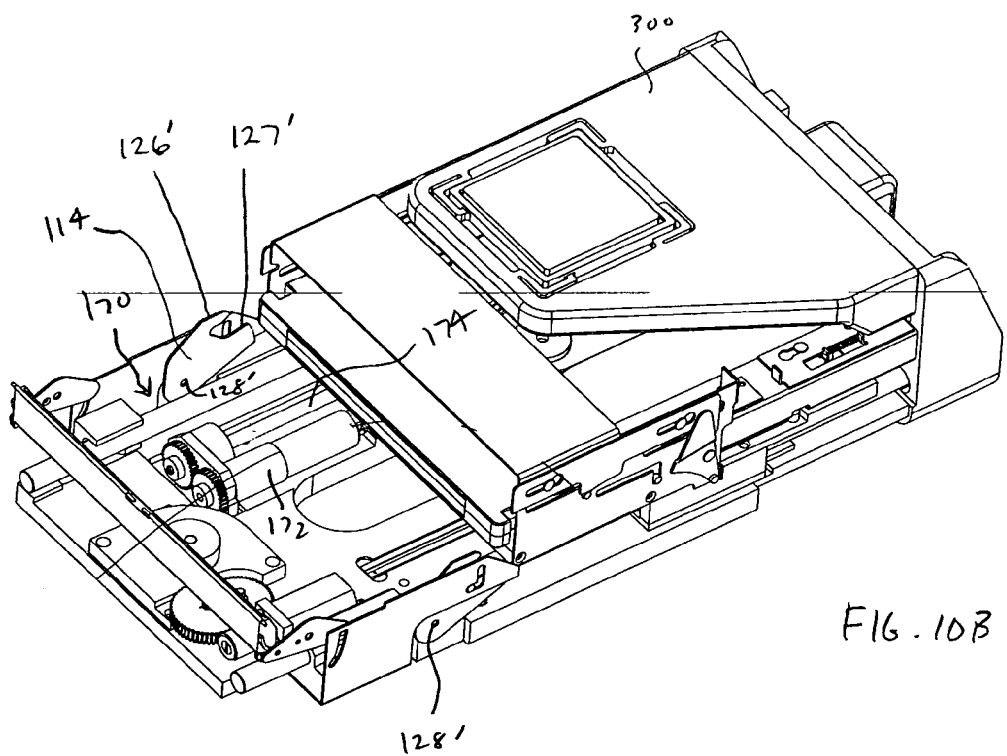

FIGS. 10A–10B show one embodiment in which the stationary data transfer mechanism comprises a holographic read/write assembly 300 and the storage medium 210 comprises a holographic storage medium 210. Examples of holographic storage are described in detail in U.S. Pat. No. 5,719,691, entitled, "Phase Correlation Multiplex Holography," to Curtis et al., issued Feb. 17, 1998, and U.S. Pat. No. 6,191,875, entitled, "Process for Holography Using Reference Beam Having Correlated Phase Content," to Curtis et al., issued Feb. 20, 2001, incorporated by reference herein in their entireties. Holographic data storage systems store information or data based on the concept of a signal beam interfering with a reference beam at a holographic storage medium. The interference of the signal beam and the reference beam creates a holographic representation, i.e., a hologram, of data elements as a pattern of varying refractive index and/or absorption imprinted in a volume of a storage or recording medium such as a photopolymer or photorefractive crystal.

In holographic data storage (HDS), light from a coherent laser source is split into two beams, signal (data-carrying) and reference beams. Digital data to be stored are "encoded" onto the signal beam via a spatial light modulator (SLM). The data are arranged into data pages or large arrays, and these data pages are translated into pixels of the spatial light modulator that either block or transmit light. The light of the signal beam traverses through the modulator and is therefore encoded with the "checkerboard" pattern of the data page. This encoded beam then interferes with the reference beam through the volume of a photosensitive recording medium, storing the digital data pages. The interference pattern induces modulations in the refractive index of the recording material yielding diffractive volume gratings. The reference beam is used during readout to diffract off of the recorded gratings, reconstructing the stored array of bits. The reconstructed array is projected onto a pixelated detector, such as a CMOS photo-detector array or the like. The detector reads the data in parallel, and the data can then be decoded into the original encoded data.

Due to the size and design of the holographic read/write assembly 300, it may be desired to maintain the assembly 300 in a stationary position. Thus, as the storage medium 210 rotates about its hub 228, only a small annular region (e.g., a single track on the disk) is exposed to the read/write assembly 300 at any given moment. Therefore, the read/write assembly 300 can only read data from that region. Accordingly, in order to enable the read/write assembly 300 to access successive annular regions of the storage medium 210, the carriage assembly 102, which is carrying the cartridge 200, is translated along the rails 125. FIG. 10A shows the carriage assembly at one end of its travel and FIG. 10B shows the carriage assembly at the other end of its travel. A carriage assembly actuator 170 may be provided to translate the carriage assembly. The carriage assembly actuator 170 may comprise a carriage motor 172 coupled through gears to a carriage screw 174. The sled 106 may include a nut which couples with the carriage screw 174, thereby translating the rotational movement of the carrier screw 174 into linear movement of the sled 106. A control system may be provided to control the movement of the carriage assembly to expose the desired tracks to the holographic read/write assembly 300 during operation of the data drive.

In accordance with various embodiments of the present invention, additional features may be added to the data drive assembly 100. For example, a shutter opener lock 180 (shown, for example, in FIGS. 2 and 7A) may be provided to retain the shutter opener 130 in the open position during operation. A pair of guide slots 186 on the shutter opener lock 180 mate with guide pins 187 on the carrier 104 to enable the shutter opener lock 180 to translate a short distance in the x-direction to provide clearance for the flange on the shutter opener body 132 that mates with the shutter lock pin 182. The shutter opener lock 180 may be releasably retained in place as shown in FIG. 7A using a spring 184 (shown in FIGS. 7B–7C). The shutter opener lock 180 may be used to offset the bias provided by shutter opener spring 136 (as shown in FIG. 7A), which biases the shutter opener 130 towards the unloaded position (shown in FIG. 5D).

The shutter opener lock 180 is released when the lock release tab 188 is contacted by the carrier guide 120 during the unloading process. The carrier guide 120 applies a force in the positive x-direction onto the release tab 188, thereby causing the shutter opener lock 180 to translate slightly in the x-direction. This releases the shutter opener body 132 from the shutter lock pin 182. The shutter opener spring 136, which applies a force onto the shutter opener 130, urges the shutter opener 130 to return to the unloaded position.

A pair of flexible cartridge retaining flanges 196 may also be provided on the carrier 104 to assist in retaining the cartridge 200 in place during operation. These flanges 196 may be received in recesses provided on the cartridge housing 230, biasing the cartridge 200 downward onto the bottom of the carrier 104.

In some embodiments, a drive door 109 is provided to cover the load port 108 when a cartridge 200 is inserted into the carrier 104. This may be particularly advantageous in applications where the data storage medium 210 is sensitive to ambient light, such as with holographic storage media. It may be desirable to have the data drive assembly 100 automatically open and close the drive door 109 at appropriate points during the loading and unloading of the cartridge 200. This may be utilized in systems where the user must manually pull the cartridge 200 out of the carrier 104 during the unloading process. The drive door 109 may be configured to open after the carrier 104 has fully uncoupled from the sled 106 and has completed its travel from the load position (wherein the carrier 104 is coupled with the sled 106) to the unload position (wherein the cartridge 200 is positioned at the load port 108 for easy removal by the user).

In the embodiment shown in FIG. 5A-5C, the drive door 109 is configured to rotate about a door axis 318. The drive door 109 may be opened and closed by a rotatable drive door cam 311. One end of the drive door cam 311 includes a pin 317 that is guided by a guide slot 313 in the load plate 112. As the load plate 112 is translated in the x-direction during the movement of the carrier 104 from the unload to the load position, the guide slot 313 applies a force onto the guide pin 317 causing the drive door cam 311 to rotate about axis 316.

The opposite end of the drive door cam 311 includes a drive door pin 314. As the cartridge 200 is withdrawn sufficiently far to clear the load port 108, the drive door 109 is drawn by gravity to close. A spring may additionally be provided to bias the door 109 in the closed position. The drive door pin 314 is positioned underneath a flange 320 in the drive door 109, and as the drive door cam 311 rotates, the drive door pin 314 guides the drive door 109 into the closed position (as shown in FIG. 8). One the door 109 is closed, a door lock flange 321 is positioned against the drive door pin 314 (as shown in FIG. 8), preventing the door 109 from being inadvertently opened. This can prevent a user from attempting to insert another cartridge into the carrier 104 after a cartridge 200 has already been loaded therein.

The opening of the drive door 109 is performed in a similar fashion. During the movement of the carrier 104 from the load position to the unload position, the load plate 112 translates in the negative x-direction. This causes the guide pin 317 to rotate the drive door cam 311 in the opposite direction. This causes the drive door pin 314 to apply a force onto the flange 320 in the positive z-direction, which, in turn, raises the door 109 into the open position.

Data drive systems incorporating the above-described data drive assembly may achieve numerous advantages over existing systems. For example, due to the similarity in size and shape of various data storage cartridge types, it may be desirable for the data drive to be configured to determine whether the proper type of cartridge is being loaded into the data drive. In accordance with aspects of the present invention, the data drive assembly 100 may be configured such that only the desired type of data storage cartridge 200 may be successfully loaded into the data drive. Other types of cartridges will be prevented from being loaded into the drive.

One method of preventing the loading of the wrong type of data storage cartridge is by providing a load port 108 having dimensions that precisely fit the dimensions of the correct cartridge type. However, this may not prevent insertion if the cartridge being inserted into the carrier 104 has similar or smaller dimensions than the intended cartridge type.

Another method of preventing the loading of the wrong cartridge type utilizes the shutter opener 130. As described above, the boss 134 of the shutter opener 130 is received in a shutter slot 222 on the cartridge 200. If the inserted cartridge does not have a shutter slot in the same position as the shutter slot 222 in the cartridge 200, the boss 134 will contact the edge of the cartridge and not be received into any slot. Thus, as the cartridge is inserted further into the carrier 104, the boss 134 will slide along the front edge of the cartridge and will not be capable of opening the cartridge shutter. Finally, when the shutter opener 130 has reached its fully loaded position (as shown in FIGS. 7A–7C), the boss 134 will be pressed against the edge of the cartridge, preventing the cartridge from being fully inserted into the carrier 104. Thus, the edge of the cartridge will not trigger the cartridge present sensor and the data drive assembly 100 will not continue to the next loading step. This will indicate to the user that the wrong type of cartridge has been inserted into the drive.

In accordance with embodiments of the present invention, the cartridge 200 is a holographic storage cartridge having external dimensions similar to or identical to a standard magneto-optical cartridge. However, the shutter slot 222 is provided at a different location along the front edge of the cartridge to prevent inadvertent loading, as described above.

In accordance with other aspects of the present invention, the carriage assembly 102 (comprising the carrier 104 coupled with the sled 106) may be translated separately from the carrier loading assembly 110 used to load the carrier 104 onto the sled 106. As shown in FIGS. 8–9, the load plate 112 and the carrier cam 114 remain in place after the carrier 104 has been lowered onto the sled 106, while the carrier 104, the sled 106, the carrier guide 120, the lock cam 160, and the lock plate 162 can translate back and forth in the x-direction in order to expose the storage medium 210 to the read/write assembly 300. This detachment of the carriage assembly 102 from the carrier loading assembly 110 can help to reduce the mass and size of the portion of the data drive assembly 100 that is translated during operation.

In accordance with other aspects of the present invention, the data drive assembly 100 is configured to open the cartridge shutter 220 only after the cartridge 200 has been inserted a predetermined distance into the carrier 104. This may be particularly advantageous in applications where the data storage medium 210 is sensitive to ambient light, such as with holographic storage media. In these embodiments, it may be desirable to configure the data drive assembly 100 such that the shutter opener 130 does not begin to open the shutter 220 until after the cartridge 200 has been received sufficiently far into the data drive that the storage medium 210 is not exposed to ambient light. This distance may be, for example, 50% of the cartridge 200 has been received into the carrier 104. This can help to ensure that the shutter 220 will not expose the storage medium 210 to light entering the drive through the load port 108. In other embodiments, the percentage of the cartridge body that is received into the carrier 104 before the shutter 220 begins to open may be, for example, 40%, 60%, 70%, 80%, 90%, or 100% of the cartridge body. In yet other embodiments, the shutter opener 130 does not begin to open the shutter 220 until after the entire shutter 220 has been received into the carrier 104.

In the embodiments described above with respect to FIGS. 1–10, the shutter opener 130 is configured to open the shutter 220 after approximately 69% of the cartridge body has been received into the carrier 104, as measured from the location of the drive door axis 318. The data drive containing the data drive assembly 100 may be longer than conventional MO data drives in order to accommodate the increased depth of insertion of the cartridge 200.

The foregoing description of the preferred embodiments of the invention has been presented for the purposes of illustration and description. It is not intended to be exhaustive or to limit the invention to the precise form disclosed. Many modifications and variations are possible in light of the above teaching. For example, although the embodiments described above refer to holographic storage systems, in other embodiments the data drive may use a different data storage method, such as, for example, optical storage, magneto-optical storage, magnetic, or electronic storage. Exemplary cartridges that may be used with the data drive assembly 100 above are described in greater detail in co-pending U.S. patent applications filed on Mar. 23, 2004: "DATA STORAGE CARTRIDGE," to Hertrich, Ser. No. 10/807,608, and "CARTRIDGE SHUTTER MECHANISM," to Hertrich, Ser. No. 10/807,644, the disclosures of which are incorporated by reference herein in their entireties.

In addition, in the above-described embodiments, the data transfer assembly 300 maintains a fixed position, while the carriage assembly 102 translates laterally across the data transfer mechanism 300 to enable the data transfer mechanism 300 to read data from all of the annular tracks of the data storage medium 210. In other embodiments, both the carriage assembly and the data transfer mechanism may be movable. This may be advantageous, for example, to facilitate faster positioning of the data transfer mechanism to the desired track on the data storage medium.

Moreover, in the embodiments described above, various steps are described as occurring sequentially during the loading process. In other embodiments, the various steps may be performed in different order, in parallel, or in partially parallel order. For example, the above-described shutter opener 130 opens the cartridge shutter 220 as the cartridge 200 is being inserted into the carrier 104 and is actuated by the insertion force applied on the cartridge 200. In other embodiments, a shutter opener may be powered by a separate shutter opener actuator and the shutter opening process may occur at different stages of the loading process.

Much of the discussion above was directed to the components illustrated in the figures as being closest to the viewer. It is understood that the data drive assembly 100 may have a symmetrical design, such that various carrier loading assembly components on one side of the cartridge 200 have matching components on the other side of the cartridge 200. This can be seen, for example, in FIG. 9, where the opposite carrier cam 114' and the opposite drive door cam 311' are exposed due to the position of the carriage assembly 102. In the illustrated embodiment, the load plate 112 is U-shaped such that a portion of the load plate 112 extends on either side of the carrier 104. In other embodiments, the load plate 112 may be formed as two separate pieces on either side of the cartridge 200. It is to be understood that the carrier guide 120 and other components of the carriage assembly 102 may have similar or identical components on the opposite side of the cartridge. This may help to produce balanced loads during operation. In yet other embodiments, the two sides may have a different design. For example, all of the carrier loading assembly 110 components may be provided on one side of the cartridge 200, and only a simple support structure provided on the other side.

It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A data drive comprising:
    a drive base;
    a data transfer mechanism is fixedly coupled to the drive base;
    a carriage assembly for receiving a cartridge containing a data storage medium; and
    a carriage assembly actuator coupled to the drive base for translating the carriage assembly to expose a plurality of radial positions of the data storage medium to the data transfer mechanism.

2. The data drive of claim 1, wherein the data transfer mechanism comprises a holographic data transfer mechanism.

3. The data drive of claim 1, wherein the carriage assembly comprises:
    a spindle for rotating a hub on a cartridge contained in the carrier, wherein the spindle is translated with the carriage assembly as the carriage assembly is translated by the carriage assembly actuator.

4. The data drive of claim 3, wherein the carriage assembly comprises
    a sled base coupled to the carriage assembly actuator; and
    a carrier for receiving the cartridge, the carrier being configured to move relative to the sled base.

5. The data drive of claim 4, further comprising:
    a carrier loading assembly for translating the carrier from an unload position to a load position, wherein the unload position positions the carrier to receive the cartridge from a load port, and the load position positions the carrier such that the hub on a cartridge within the carrier is mated with the spindle.

6. The data drive of claim 5, wherein the carrier loading assembly is fixedly coupled to the drive base.

7. The data drive of claim 5, wherein the carrier loading assembly translates the carrier from the unload position to the load position by:
    first, translating the carrier in a horizontal direction such that the hub on a cartridge within the carrier is positioned coaxial with the spindle; and
    second, translating the carrier in a vertical direction to the load position.

8. The data drive of claim 7, wherein:
    the drive base further comprises a carrier guide having at least one guide slot for receiving at least one guide pin provided on the carrier; and
    the carrier loading assembly further comprises at least one guide pin driving member for actuating movement of the at least one guide pin along the at least one guide slot.

9. The data drive of claim 8, wherein:
    the at least one guide pin driving member comprises a plate rotatable about a driving member axis;
    the carrier loading assembly further comprises a load plate movable in a lateral direction from an unload position to a load position, the load plate being configured to cause the at least one guide pin driving member to rotate about the driving member axis when the load plate moves from the unload position to the load position.

10. The data drive of claim 9, further comprising:
    a drive door configured to cover the load port in a closed position and to expose the load port in an open position;
    wherein the load plate is further configured to move the drive door into the closed position as the load plate moves from the unload position to the load position.

11. The data drive of claim 9, further comprising:
    a lock cam for retaining at least one guide pin to prevent the carrier from moving out of the load position.

12. The data drive of claim 4, wherein the carrier further comprises a shutter opener, said shutter opener comprising a lock release for releasing a lock on the cartridge.

13. The data drive of claim 12, wherein the shutter opener comprises:
    a shutter body member rotatable about a shutter opener axis; and
    a shutter opener boss provided on the shutter body member distal from the shutter opener axis.

14. The data drive of claim 13, wherein the shutter opener boss comprises:
    a shutter opening portion; and a shutter opener boss lock release portion configured to contact a lock on the cartridge prior to the shutter opening portion contacting a shutter on the cartridge.

15. The data drive of claim 14, wherein:
the shutter opener boss is offset from the shutter opener axis such that as a cartridge is inserted into the carrier, the shutter body member rotates about the shutter opener axis, causing the shutter opener boss to travel laterally across a front edge of the cartridge.

16. The data drive of claim 14, wherein:
the shutter opening portion comprises a first portion of the shutter opener boss having a first width; and
the lock release portion comprises a second portion of the shutter opener boss having a second width larger than the first width.

17. The data drive of claim 1, wherein the carriage assembly further comprises a shutter opener.

18. The data drive of claim 17, wherein the shutter opener is configured to begin opening a shutter on a cartridge after the cartridge has been received a predetermined distance into the carriage assembly.

19. The data drive of claim 18, wherein the shutter opener is configured to begin opening a shutter on a cartridge after the shutter has been received in the carriage assembly.

20. A data drive comprising:
a data transfer mechanism;
a carriage assembly for receiving a cartridge containing a data storage medium, said carriage assembly having a movable shutter with a shutter lock; and
a shutter opener comprising a lock release for releasing a lock on the cartridge, wherein the shutter opener comprises:
a shutter body member rotatable about a shutter opener axis: and
a shutter opener boss provided on the shutter body member distal from the shutter opener axis, and wherein the shutter opener boss comprises a shutter opening portion and a lock release portion configured to contact a lock on the cartridge prior to the shutter opening portion contacting a shutter on the cartridge.

21. The data drive of claim 20, wherein the data transfer mechanism comprises a holographic data transfer mechanism.

22. The data drive of claim 20, wherein:
the shutter opener boss is offset from the shutter opener axis such that as a cartridge is inserted into the carrier, the shutter opener rotates about the shutter opener axis, causing the shutter opener boss to travel laterally across a front edge of the cartridge.

23. The data drive of claim 20, wherein:
the shutter opening portion comprises a first portion of the shutter opener boss having a first width; and
the lock release portion comprises a second portion of the shutter opener boss having a second width larger than the first width.

24. The data drive of claim 20, wherein the shutter opener is configured to begin opening a shutter on a cartridge after the cartridge has been received a predetermined distance into the carriage assembly.

25. The data drive of claim 24, wherein the shutter opener is configured to begin opening a shutter on a cartridge after the shutter has been received in the carriage assembly.

26. The data drive of claim 24, wherein the shutter opener is configured to begin opening a shutter on a cartridge after at least 50% of the cartridge has been received in the carriage assembly.

27. A data drive comprising:
a drive base;
a data transfer mechanism coupled to the drive base;
a carriage assembly for receiving a cartridge containing a data storage medium; and
a carriage assembly actuator coupled to the drive base for translating the carriage assembly to expose a plurality of radial positions of the data storage medium to the data transfer mechanism, wherein the carriage assembly comprises a spindle for rotating a hub on a cartridge contained in the carrier, and wherein the spindle is translated with the carriage assembly as the carriage assembly is translated by the carriage assembly actuator.

28. The data drive of claim 27, wherein the data transfer mechanism comprises a holographic data transfer mechanism.

29. The data drive of claim 27, wherein the data transfer mechanism is fixedly coupled to the drive base.

30. The data drive of claim 29, wherein the carriage assembly comprises:
a sled base coupled to the carriage assembly actuator; and
a carrier for receiving the cartridge, the carrier being configured to move relative to the sled base.

31. The data drive of claim 30, further comprising:
a carrier loading assembly for translating the carrier from an unload position to a load position, wherein the unload position positions the carrier to receive the cartridge from a load port, and the load position positions the carrier such that the hub on a cartridge within the carrier is mated with the spindle.

32. The data drive of claim 31, wherein the carrier loading assembly is fixedly coupled to the drive base.

33. The data drive of claim 31, wherein the carrier loading assembly translates the carrier from the unload position to the load position by:
first, translating the carrier in a horizontal direction such that the hub on a cartridge within the carrier is positioned coaxial with the spindle; and
second, translating the carrier in a vertical direction to the load position.

34. The data drive of claim 33, wherein:
the drive base further comprises a carrier guide having at least one guide slot for receiving at least one guide pin provided on the carrier; and
the carrier loading assembly further comprises at least one guide pin driving member for actuating movement of the at least one guide pin along the at least one guide slot.

35. The data drive of claim 34, wherein:
the at least one guide pin driving member comprises a plate rotatable about a driving member axis;
the carrier loading assembly further comprises a load plate movable in a lateral direction from an unload position to a load position, the load plate being configured to cause the at least one guide pin driving member to rotate about the driving member axis when the load plate moves from the unload position to the load position.

36. The data drive of claim 35, further comprising:
a drive door configured to cover the load port in a closed position and to expose the load port in an open position;
wherein the load plate is further configured to move the drive door into the closed position as the load plate moves from the unload position to the load position.

37. The data drive of claim 35, further comprising:
a lock cam for retaining at least one guide pin to prevent the carrier from moving out of the load position.

38. The data drive of claim 30, wherein the carrier further comprises a shutter opener, said shutter opener comprising a lock release for releasing a lock on the cartridge.

39. The data drive of claim 38, wherein the shutter opener comprises:
a shutter body member rotatable about a shutter opener axis; and
a shutter opener boss provided on the shutter body member distal from the shutter opener axis.

40. The data drive of claim 39, wherein the shutter opener boss comprises:
a shutter opening portion; and
a shutter opener boss lock release portion configured to contact a lock on the cartridge prior to the shutter opening portion contacting a shutter on the cartridge.

41. The data drive of claim 40, wherein:
the shutter opener boss is offset from the shutter opener axis such that as a cartridge is inserted into the carrier, the shutter body member rotates about the shutter opener axis, causing the shutter opener boss to travel laterally across a front edge of the cartridge.

42. The data drive of claim 40, wherein:
the shutter opening portion comprises a first portion of the shutter opener boss having a first width; and
the lock release portion comprises a second portion of the shutter opener boss having a second width larger than the first width.

43. The data drive of claim 27, wherein the carriage assembly further comprises a shutter opener.

44. The data drive of claim 43, wherein the shutter opener is configured to begin opening a shutter on a cartridge after the cartridge has been received a predetermined distance into the carriage assembly.

45. The data drive of claim 44, wherein the shutter opener is configured to begin opening a shutter on a cartridge after the shutter has been received in the carriage assembly.

* * * * *